United States Patent [19]
Moyer et al.

[11] Patent Number: 6,145,097
[45] Date of Patent: Nov. 7, 2000

[54] METHOD AND APPARATUS FOR PROVIDING OPERAND FEED FORWARD SUPPORT IN A DATA PROCESSING SYSTEM

[75] Inventors: William C. Moyer, Dripping Springs; John Arends, Austin, both of Tex.

[73] Assignee: Motorola Inc., Schaumburg, Ill.

[21] Appl. No.: 08/924,117

[22] Filed: Sep. 5, 1997

[51] Int. Cl.$^7$ .................................................. G06F 9/00
[52] U.S. Cl. ........................ 714/30; 714/30; 714/726; 714/727; 714/729; 714/733; 714/734
[58] Field of Search ............................. 714/30, 726, 727, 714/729, 734, 733

[56] References Cited

U.S. PATENT DOCUMENTS

| | | | |
|---|---|---|---|
| 4,715,013 | 12/1987 | MacGregor et al. | 364/900 |
| 4,731,736 | 3/1988 | Mothersole et al. | 364/900 |
| 4,991,078 | 2/1991 | Wilhelm et al. | 364/200 |
| 5,001,624 | 3/1991 | Hoffman et al. | 364/200 |
| 5,359,547 | 10/1994 | Cummins et al. | 702/119 |
| 5,577,250 | 11/1996 | Anderson et al. | 395/670 |
| 5,603,047 | 2/1997 | Caulk, Jr. | 395/800 |

OTHER PUBLICATIONS

Author unknown, Definitions for various computer terminology, www.OneLook.com, published Jun. 1997.

Motorola Inc. 1990, "M68300 Family CPU32 Central Processor Unit Reference Manual", Section 7 Development Support, pp. 7–1 through 7–31.

Motorola Inc. 1995, "DSP56300 24-Bit Digital Signal Processor Family Manual", Section 10 On–Chip Emulator (OnCE™), pp. 10–1 through 10–29.

Motorola Inc. 1995, "DSP56300 24-Bit Digital Signal Processor Family Manual", Section 11 JTAG (IEEE 1149.1) Test Access Port, pp. 11–1 through 11–9.

*Primary Examiner*—Robert W. Beausoliel, Jr.
*Assistant Examiner*—Bryce Bonzo
*Attorney, Agent, or Firm*—Susan C. Hill

[57] ABSTRACT

The present invention relates in general to a data processing system (10), and more particularly to a method and apparatus for providing operand feed forward support in a data processing system (10). In one embodiment, a scan chain (100) may be combined with a feed forward source Y (FFY) bit (64) to allow a user to update registers (50) and memory (18) during emulation and debug. In one embodiment, feed forward control circuitry (60) forces the content of the WBBR register (70) to be used as the Y source operand value for the first instruction to be executed following an update of scan chain (100). This allows debug module (14) to update processor registers (50) and/or memory (18) by initializing the WBBR register (70) with the desired value, asserting the FFY bit (64), and executing a processor (12) move instruction to the desired register in registers (50).

28 Claims, 4 Drawing Sheets

METHOD AND APPARATUS FOR PROVIDING OPERAND FEED FORWARD SUPPORT IN A DATA PROCESSING SYSTEM

FIELD OF THE INVENTION

The present invention relates in general to a data processing system, and more particularly to a method and apparatus for providing operand feed forward support in a data processing system.

BACKGROUND OF THE INVENTION

It is important to provide a useful and cost effective approach for allowing emulation and debug of a data processing system, particularly when the data processing system is implemented on an integrated circuit with limited pins or terminals to communicate information. Most emulation and debug approaches provide a mechanism to allow observability and controllability of portions of circuitry within the data processing system. One such emulation and debug approach is the OnCE™ circuitry and methodology used on a variety of integrated circuits available from Motorola, Inc. of Austin, Tex. The use of serial scan chains is yet another approach that may be used. In addition, the serial scan approach may take advantage of the JTAG (Joint Test Action Group) specification which defines a hardware interface and a serial communication protocol.

In determining an approach to be used for emulation and debug of a data processing system, a tradeoff is usually required between the ease of use and the amount observability and controllability on the one hand, and the amount of special emulation and debug circuitry that must be added on the other hand. A solution was needed which would allow the maximum observability and controllability for emulation and debug as possible, while adding the least amount of special emulation and debug circuitry that is not also used during normal operation. In a solution was needed which would allow maximum observability and controllability, but which would not significantly impact the internal operation and speed of the data processing system.

DESCRIPTION OF THE PREFERRED EMBODIMENT

The term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

DESCRIPTION OF THE FIGURES

Figure 1:
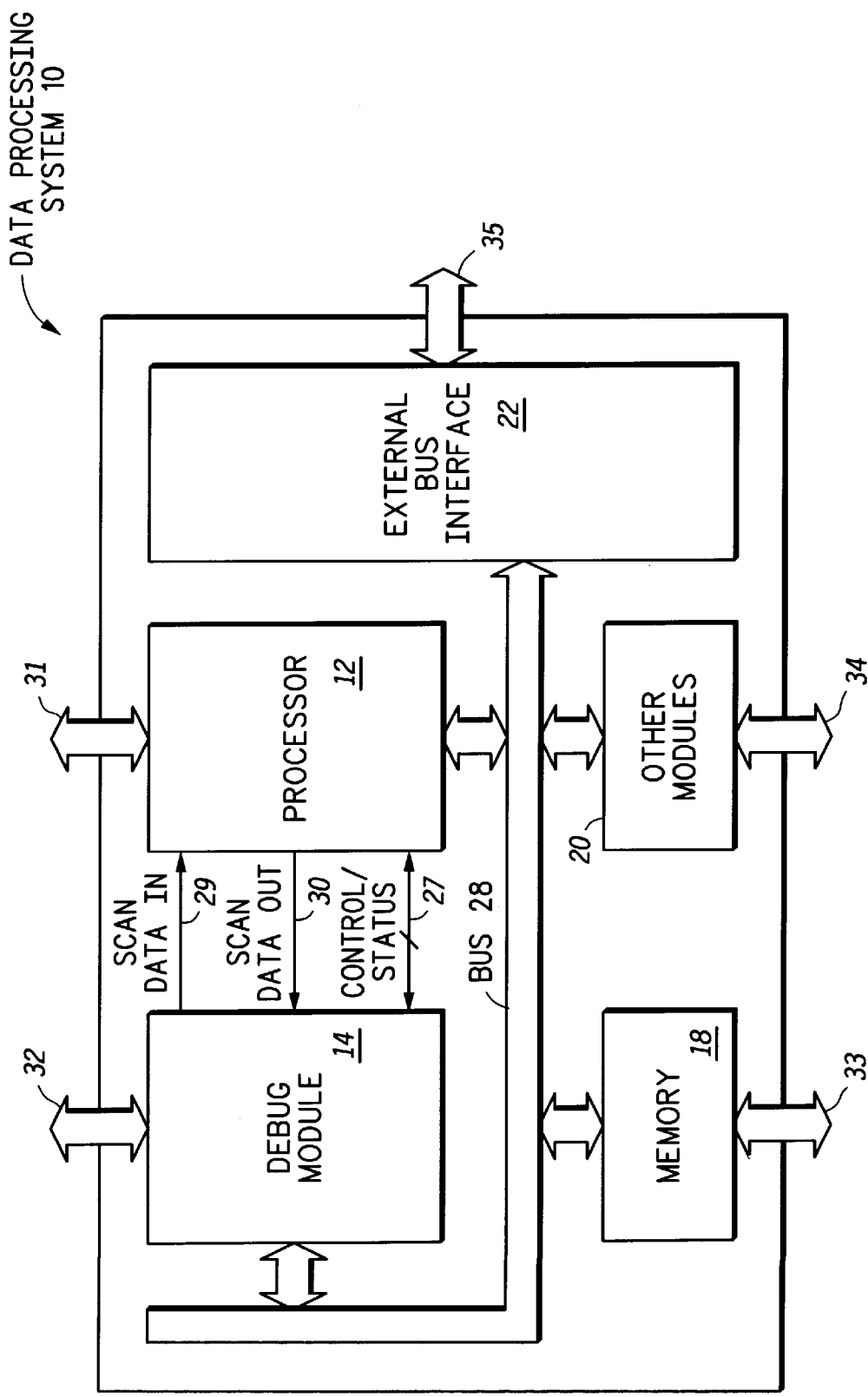
FIG. 1 illustrates, in block diagram form, a data processing system 10 in accordance with one embodiment of the present invention.

FIG. 1 illustrates one embodiment of a data processing system 10 which includes a processor 12, a debug module 14, a memory 18, other modules 20, and external bus interface 22 which are all bi-directionally coupled by way of bus 28. Alternate embodiments of the present invention may not include one or more of memory 18, other modules 20, and external bus interface 22 as part of data processing system 10. Note that other modules 20 may include any type of functional circuitry, such as, for example, a timer, a serial port, additional memory of any type, I/O ports, etc. Also, debug module 14 may use a wide variety of techniques for providing emulation and debug signals external to data processing system 10.

Still referring to FIG. 1, external bus interface 22 is bi-directionally coupled external to data processing system 10 by way of integrated circuit terminals 35. Processor 12 may optionally be coupled external to data processing system 10 by way of integrated circuit terminals 31. Debug module 14 may optionally be coupled external to data processing system 10 by way of integrated circuit terminals 32. Note that debug module 14 may convey emulation and debug information external to data processing system 10 by way of integrated circuit terminals 32 and/or by way of bus 28, external bus interface 22, and integrated circuit terminals 35. Memory 18 may optionally be coupled external to data processing system 10 by way of integrated circuit terminals 33. Other modules 20 may optionally be coupled external to data processing system 10 by way of integrated circuit terminals 34. Debug module 14 provides a SCAN DATA IN signal 29 to processor 12 and receives a SCAN DATA OUT signal 30 from processor 12. Debug module 14 and processor 12 are also bi-directionally coupled by way of control/status conductors 27.

Figure 2:
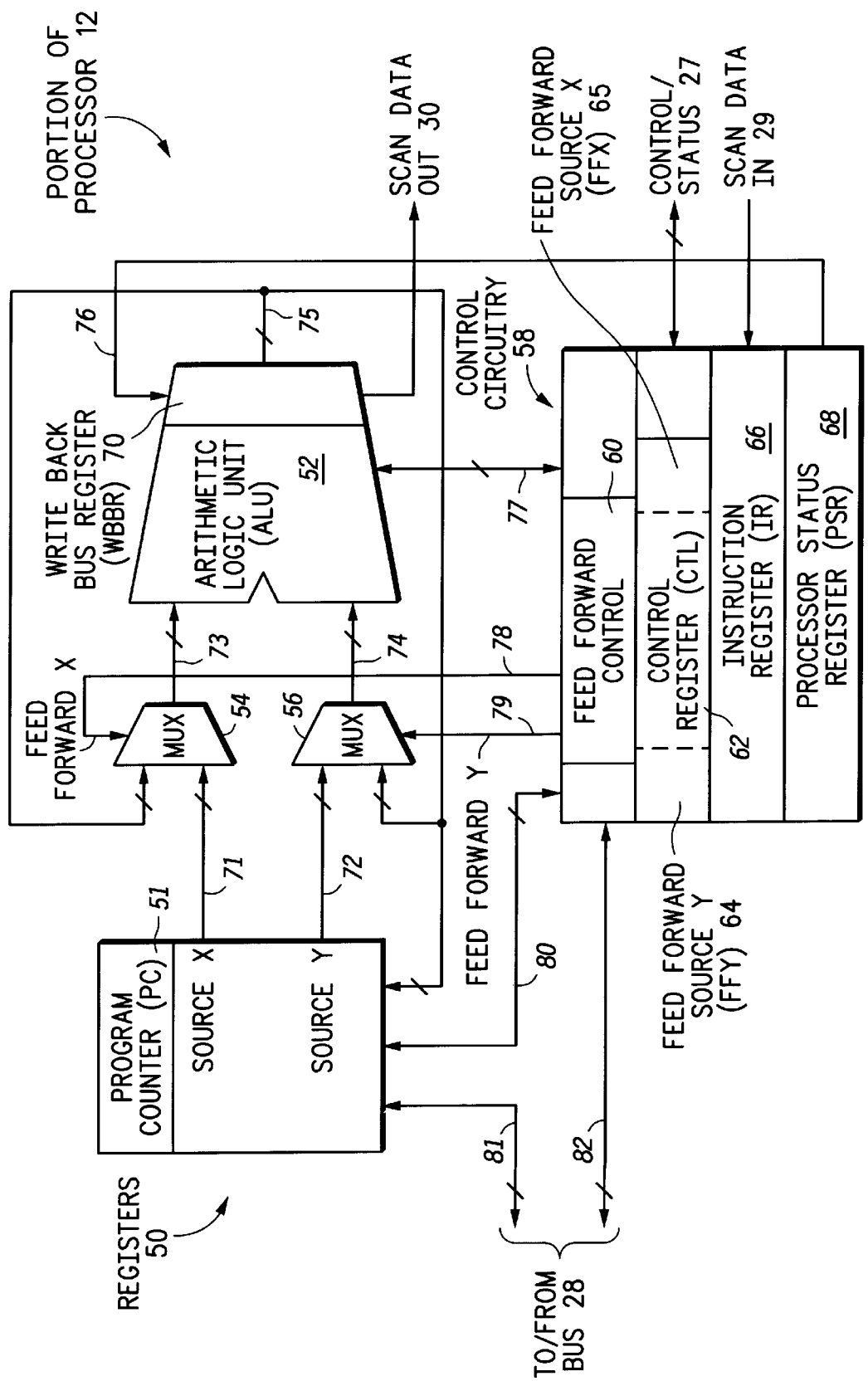
FIG. 2 illustrates, in block diagram form, a portion of processor 12 of FIG. 1 in accordance with one embodiment of the present invention.

FIG. 2 illustrates one embodiment of a portion of processor 12 of FIG. 1. In one embodiment, processor 12 includes registers 50, which comprise a register file, are coupled to multiplexer (MUX) 54 by way of conductors 71, and are coupled to multiplexer (MUX) 56 by way of conductors 72. Registers 50 include a program counter (PC) register 51, as well as a plurality of other address, data, and control registers. Multiplexer 54 is coupled to arithmetic logic unit (ALU) 52 by way of conductors 73. Multiplexer 56 is coupled to ALU by way of conductors 74. The output of ALU 52 is coupled to write back bus register (WBBR) 70. The WBBR register 70 is coupled to registers 50 by way of conductors 75, which may be considered as the "write back bus" used to write a result value from ALU 52 back to a destination register. The WBBR register 70 is also coupled to an input of multiplexer 54 and to an input of multiplexer 56 by way of conductors 75.

Control circuitry 58 includes control register (CTL) 62, instruction register (IR) 66, and processor status register (PSR) 68. In one embodiment of the present invention, control register 62 includes a feed forward source Y (FFY) bit 64 and a feed forward source X (FFX) bit 65. Alternate embodiments of the present invention may implement only a feed-forward control bit for one of the source operands, i.e. either source operand X only, or source operand Y only. Alternate embodiments of the present invention may have more than two source operands (X, Y, Z, etc.) and may use one bit for each source operand. Also, alternate embodiments of the present invention may encode the functionality of one or more of the feed forward source bits 64, 65 into one or more bits that also source other functions.

Still referring to FIG. 2, control circuitry 58 includes feed forward control circuitry 60 which provides a FEED FOR- WARD X operand signal 78 to multiplexer 54 and which provides a FEED FORWARD Y operand signal 79 to multiplexer 56. Control register 62 receives a SCAN DATA IN signal 29. Control circuitry 58 is bi-directionally coupled to control/status conductors 27. Control circuitry 58 is bi-directionally coupled to ALU 52 by way of conductors 77 in order to provide and receive control and status information. Control circuitry 58 is bi-directionally coupled to registers 50 by way of conductors 80 to provide and receive status and control information. Control circuitry 58 is bi-directionally coupled to bus 28 by way of conductors 82. Registers 50 are bi-directionally coupled to bus 28 by way of conductors 81. Processor status register (PSR) 68 is coupled to write back bus register (WBBR) 70 in order to provide a scan input by way of conductor 76. The WBBR register 70 then provides a SCAN DATA OUT signal 30.

Figure 3:
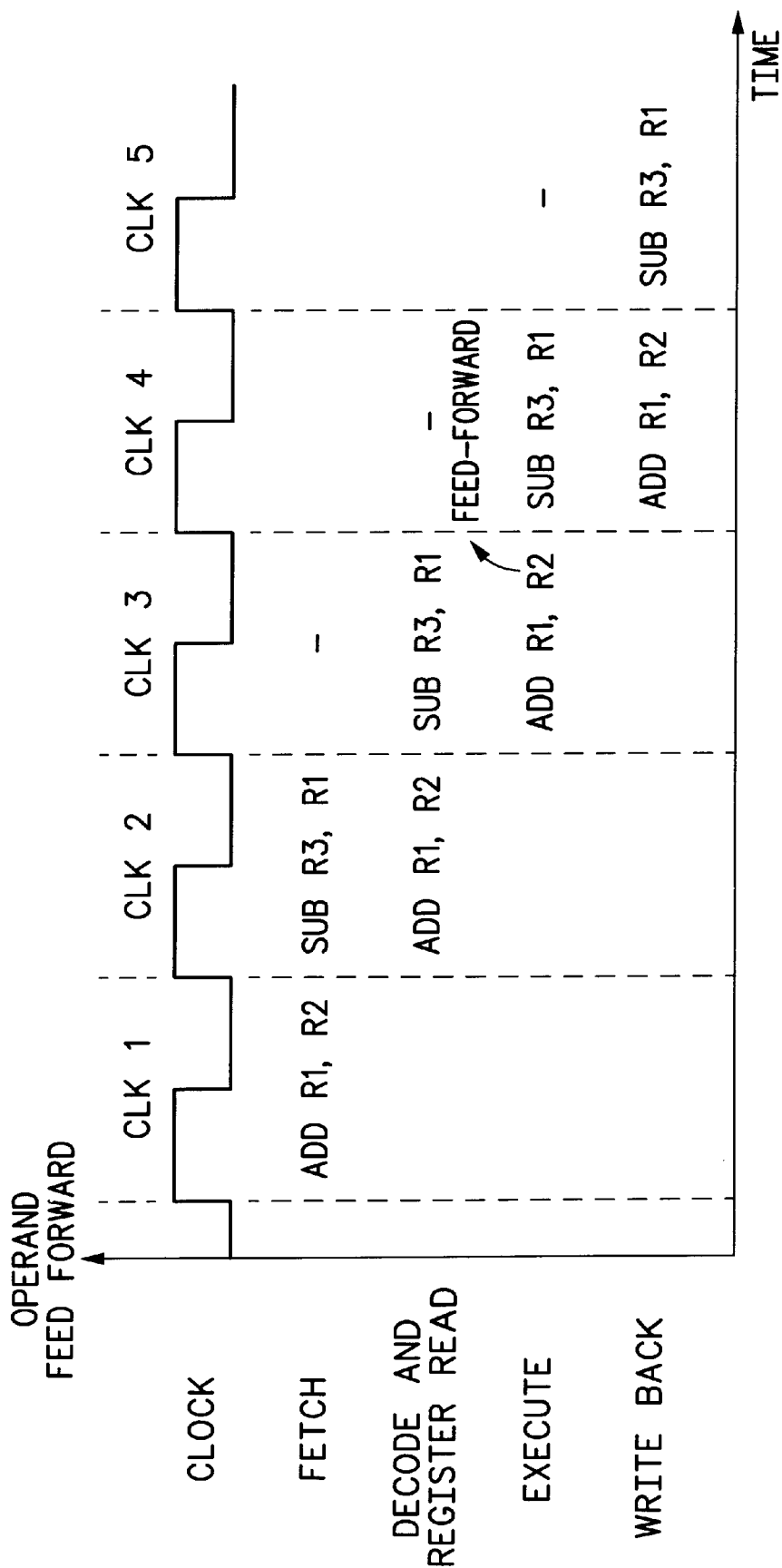
FIG. 3 illustrates, in timing diagram form, an example of operand feed-forward in accordance with one embodiment of the present invention.

FIG. 3 illustrates an example of operand feed forward in accordance with one embodiment of the present invention.

Figure 4:
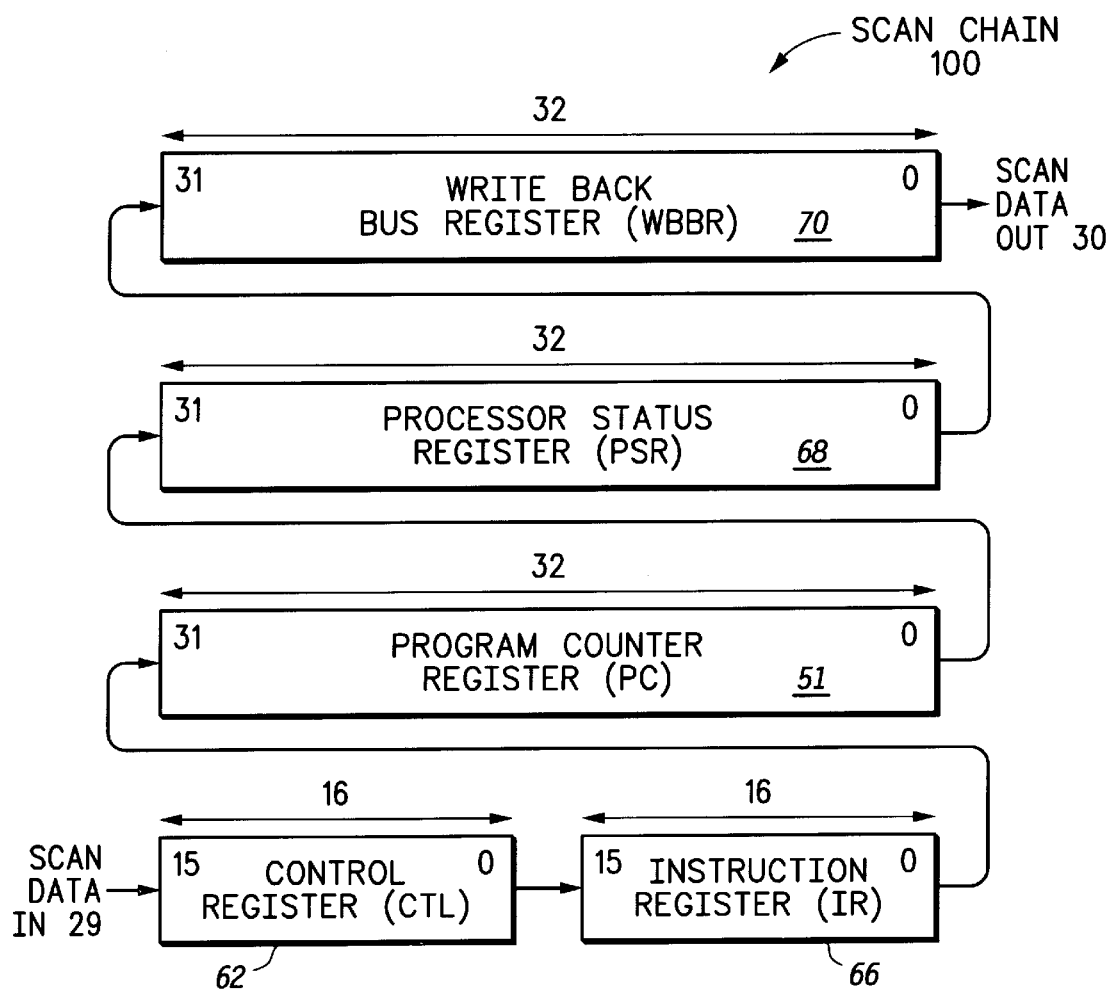
FIG. 4 illustrates, in block diagram form, a scan chain 100 in accordance with one embodiment of the present invention.

FIG. 4 illustrates one embodiment of an emulation and debug serial scan chain 100 utilized by the present invention. In the embodiment illustrated in FIG. 4, SCAN DATA IN signal 29 is provided as a serial input to bit 15 of control register (CTL) 62. Bit 0 of control register 62 is serially coupled to bit 15 of instruction register 66. Bit 0 of instruction register (IR) 66 is serially coupled to bit 31 of program counter register (PC) 51. Bit 0 of program counter register 51 is serially coupled to bit 31 of processor status register (PSR) 68. Bit 0 of processor status register 68 is serially coupled to bit 31 of write back bus register (WBBR) 70. Bit 0 of write back bus register 70 is serially coupled to provide the SCAN DATA OUT signal 30 from processor 12 to debug module 14 (see FIG. 1).

OPERATION OF THE PREFERRED EMBODIMENT

The operation of the present invention will now be discussed. In one embodiment, the present invention provides a mechanism to load a predetermined value into a selected register or memory location during emulation or debug. In addition, the present invention does not require parallel loads of the busses within processor 12 (see FIG. 2) and does not require dedicated addressable registers that are used only during emulation and debug and serve no useful purpose during normal operation of data processing system 10 (see FIG. 1).

Instead of requiring additional emulation and debug circuitry, the present invention reuses existing registers and latches in processor 12 and couples them in a serial scan chain 100 (see FIG. 4). In one embodiment of the present invention, a feed forward source Y control bit (FFY) 64 is used to indicate whether or not the predetermined value stored in the write back bus register (WBBR) 70 is to be loaded as the source operand Y into MUX 56. By allowing the predetermined value stored in the WBBR register 70 to be "fed forward" and forced as the source operand Y of ALU 52, instructions can be executed by processor 12 in emulation and debug mode which store the contents of the WBBR register 70 into a user selected register in registers 50 or into user selected memory locations in memory 18 (see FIG. 1).

In alternate embodiments of the present invention, a feed forward source X control bit (FFX) 65 is used to indicate whether or not the predetermined value stored in the write back bus register (WBBR) 70 is to be loaded as the source operand X into MUX 54. By allowing the predetermined value stored in the WBBR register 70 to be "fed forward" and forced as the source operand X of ALU 52, instructions can be executed by processor 12 in emulation and debug mode which store the contents of the WBBR register 70 into a user selected register in registers 50 or into user selected memory locations in memory 18 (see FIG. 1). Note that memory 18 may alternately be located on a different integrated circuit that data processing system 10 and may be accessed by processor 12 by way of bus 28, external bus interface 22, and integrated circuit terminals 35.

Referring to FIG. 1, in one embodiment of the present invention data processing system 10 has a debug module 14 which is used to control debug and emulation processing. Debug module 14 communicates with processor 12 by way of the SCAN DATA IN signal 29, the SCAN DATA OUT signal 30, and control/status conductors 27. The serial scan chain 100 formed by SCAN DATA IN 29 and SCAN DATA OUT 30 is illustrated in FIG. 4. In one embodiment of the present invention the registers illustrated in FIG. 4 have been selected to be included in the scan chain. In alternate embodiments of the present invention, different registers, fewer registers, or more registers could be included in this scan chain 100.

The registers included in scan chain 100 are also illustrated in FIG. 2 as part of processor 12. In one embodiment of the present invention, the processor status register (PSR) 68 and the program counter register (PC) 51 are considered part of the programmer's model, whereas write back bus register (WBBR) 70, control register (CTL) 62, and instruction register (IR) 66 are merely internal latches available within processor 12 that are used during normal operation of processor 12, but that are not normally available for direct access by the user. However, scan chain 100 allows all of the registers in FIG. 4 including write back bus register (WBBR) 70, control register (CTL) 62, and instruction register (IR) 66 to be accessible by the user in emulation or debug mode. Allowing access to these registers by way of serial scan chain 100 provides a significant advantage for debug and emulation. For example the feed forward source Y bit 64 may be used in conjunction with the write back bus register (WBBR) 70 in order to allow the user to load a predetermined value into a selected register or memory location by substituting the predetermined value as the intended Y operand. Similarly, the feed forward source X bit 65 may be used in conjunction with the write back bus register (WBBR) 70 in order to allow the user to load a predetermined value into a selected register or memory location by substituting the predetermined value as the intended X operand.

Referring to FIG. 3, an example of operand feed forward is illustrated. Although the example in FIG. 3 shows normal instruction execution operation, the feed forward mechanism illustrated in FIG. 3 is the same mechanism used in debug and emulation mode to substitute the predetermined value store in the WBBR register 70 for the X and/or Y source operand to ALU 52. Note that the user may load the predetermined value into the WBBR register 70 by way of the SCAN DATA IN signal 29 during emulation and debug mode. The debug module 14 (see FIG. 1) is used to provide the proper values to the SCAN DATA IN signal 29.

FIG. 3 illustrates the execution of an add instruction followed by a subtraction instruction. During clock cycle 1 the add instruction is fetched. Note that the R1 register is the source of the X operand and the R2 register is source of the Y operand. During clock cycle 2 the next instruction, a subtract instruction, is fetched while concurrently the add instruction is decoded and the R1 and R2 registers are read from registers 50. During clock cycle 3, the subtract instruction is decoded and registers R3 and R1 are read from registers 50. Concurrently during clock cycle 3, the add instruction is executed with the result of the add instruction being stored in write back bus register (WBBR) 70 in preparation for the update of register R1 with the result value. However, since the subtract instruction requires the result of the add instruction as the Y operand, the R1 register value read from registers 50 during clock cycle 3 is discarded and the add result value stored in the write back bus register (WBBR) 70 is fed forward into MUX 56 by way of conductors 75. Therefore the add result value is "fed forward" to ALU 52 by way of conductors 74 as the updated Y operand for the subtract instruction.

Referring to FIGS. 2 and 3, the present invention uses the same feed forward mechanism from write back bus register (WBBR) 70 to MUX 56 by way of conductors 75 in order to substitute a predetermine value for the Y source operand that would normally be provided from registers 50. Feed forward control circuitry 60 provides the control to MUX 56 by way of conductor 79 in order to select this feed forward path from write back register (WBBR) 70.

Still referring to FIG. 3, during clock cycle 4 the feed forward value from write back bus registers (WBBR) 70 is used as the Y operand during the subtract operation. Concurrently, the result from the add instruction, which is presently stored in write back bus register (WBBR) 70, is provided to registers 50 by way of conductors 75 in order to update the R1 register with the result of the addition operation. During clock cycle 5, the result of the subtract instruction, which is now stored in write back bus register (WBBR) 70, is used to update register 3 in registers 50 by way of conductors 75.

In one embodiment of the present invention the feed forward control circuitry 60 provides the control to multiplexers 54 and 56 in order to allow the feed forward of operands to ALU 52 to take place. Note that feed forward control circuitry 60 receives the feed forward source Y bit 64 and the feed forward source X bit 55. If the FFY bit 64 is zero then feed forward will occur if the RY field of the instruction currently being decoded will be taken from the write back bus register 70 of the instruction currently being executed. Similarly if the FFX bit 65 is zero feed forward will occur if the RX field of the instruction currently being decoded is the same as the result value stored in the write back bus register (WBBR) 70 of the instruction currently being executed. However if the FFY bit 64 equals 1, then feed forward of the Y operand is forced and always occurs regardless of the instructions are currently being decoded and executed. Similarly if the FFX bit 65 is asserted, then feed forward is forced and always occurs regardless of the instructions currently being decoded and executed.

In one embodiment of the present invention, the FFY bit 64 may be negated by feed forward control circuitry 60 after a single instruction has been executed while the FFY bit 64 was asserted. In this manner, only a single predetermined value is loaded into a selected register or memory location from the WBBR register 70 by using a single move, load, store, or other processor 12 instruction. Similarly, the FFX bit 65 may be negated by feed forward control circuitry 60 after a single instruction has been executed while the FFX bit 65 was asserted. In this manner, again, only a single predetermined value is loaded into a selected register or memory location from the WBBR register 70 by using a single move, load, store, or other processor 12 instruction. Alternate embodiments of the present invention may not automatically clear the FFY bit 64 and the FFX bit 65 after a single instruction has been executed. Alternate embodiments of the present invention may use a different approach, including a user programmable approach, for clearing the FFY bit 64 and the FFX bit 65.

By allowing feed forward to be forced using one or more of the FFX bit 65 and the FFY bit 64, the user of data processing system 10 can scan selected values into scan chain 100 (see FIG. 4) in order to load a predetermined value into write back bus register (WBBR) 70, which can then be loaded into a selected register or memory location by using move, load, store, or other processor 12 instructions having a designated destination from ALU 52.

While the present invention has been illustrated and described with reference to specific embodiments, further modifications and improvements will occur to those skilled in the art. It is to be understood, therefore, that this invention is not limited to the particular forms illustrated and that the appended claims cover all modifications that do not depart from the spirit and scope of this invention.

What is claimed is:

1. A data processing system that provides a debug capability, said data processing system comprising:
   an arithmetic logical unit with a first ALU input;
   a write back bus register that receives results from the arithmetic logical unit;
   a first selector circuit that selects one of a plurality of selector circuit inputs as the first ALU input, wherein:
   one of the plurality of selector circuit inputs is an output from the write back bus register; and
   a feed forward control circuit that programatically forces the first selector circuit to select the output from the write back bus register during an execution of a standard processor instruction in order to perform a debug function.

2. The data processing system in claim 1 wherein:
   the write back bus register is loaded by a serial scan operation.

3. The data processing system in claim 2 wherein:
   a single scan chain comprises:
   a contents of a write back bus register, and
   a contents of an instruction register for use when decoding instructions.

4. The data processing system in claim 2 wherein:
   a single scan chain comprises:
   a contents of a write back bus register, and
   a contents of a processor status register.

5. The data processing system in claim 2 wherein:
   a single scan chain comprises:
   a contents of a write back bus register, and
   a contents of a program counter register.

6. The data processing system in claim 2 wherein:
   a single scan chain comprises:
   a contents of a write back bus register, and
   a contents of a debug control register containing a feed forward bit for use when debugging.

7. The data processing system in claim 2 wherein:
   a single scan chain comprises:
   a contents of a write back bus register,
   a contents of an instruction register for use when decoding instructions,
   a contents of a processor status register,
   a contents of a program counter register, and
   a contents of a debug control register containing a feed forward bit for use when debugging.

8. The data processing system in claim 2 which further comprises:
   a debug module for controlling the serial scan operation.

9. The data processing system in claim 8 which further comprises:
an external interface to the debug module for reading scan data into and writing scan data from the data processing system.

10. The data processing system in claim 1 wherein:
the feed forward control circuit comprises a feed forward latch with a first logical state and a second logical state,
the selection of the output from the write back bus register by the first selector circuit is forced when the feed forward latch is in the first logical state, and
the selection of the output from the write back bus register by the first selector circuit is conditional based on a status of a pipeline when the feed forward latch is in the second logical state.

11. The data processing system in claim 10 wherein:
the feed forward latch is reset to the second logical state after a single instruction is executed with the feed forward latch in the first logical state.

12. The data processing system in claim 10 wherein:
the first selector circuit selects the output from the write back bus register when the feed forward latch is in a second logical state and a register conflict is detected in the pipeline.

13. The data processing system in claim 1 which further comprises:
a second selector circuit that selects one of a plurality of second selector circuit inputs as a second ALU input, wherein:
one of the plurality of second selector circuit inputs is an output from the write back bus register; and
a second feed forward control circuit that programatically forces the second selector circuit to select the output from the write back bus register during an execution of the standard processor instruction in order to perform the debug function.

14. The data processing system in claim 13 wherein:
the second feed forward control circuit comprises a second feed forward latch with a first logical state and a second logical state,
the selection of the output from the write back bus register by the second selector circuit is forced when the second feed forward latch is in the first logical state, and
the selection of the output from the write back bus register by the second selector circuit is conditional based on a status of a pipeline when the second feed forward latch is in the second logical state.

15. The data processing system in claim 14 wherein:
the second feed forward latch is reset to the second logical state after a single instruction is executed with the second feed forward latch in the first logical state.

16. The data processing system in claim 15 wherein:
the second selector circuit selects the output from the write back bus register when the second feed forward latch is in a second logical state and a register conflict is detected in the pipeline.

17. The data processing system in claim 1 which further comprises:

a register file containing a plurality of registers, wherein:
a second one of the plurality of selector circuit inputs is received from the register file.

18. A method of debugging a data processing system comprising:
testing a feed forward operand latch that has a first logical state and a second logical state,
unconditionally selecting an operand from a first register as a first input to an arithmetic logical unit when the feed forward operand latch is in the first logical state, and
conditionally selecting the operand either from the first register or a second operand source as the first input to the arithmetic logical unit when the feed forward operand latch is in the second logical state
wherein the first register comprises a write back result register.

19. The method in claim 18 wherein:
the second operand source is a register file.

20. The method in claim 18 which further comprises:
loading the first register from an external source.

21. The method in claim 20 wherein:
the first register is loaded from the external source by a serial scan operation.

22. The method in claim 18 which further comprises:
loading the feed forward operand latch from an external source.

23. The method in claim 22 which further comprises:
loading the first register from the external source.

24. The method in claim 18 which further comprises:
loading an instruction into an instruction register from an external source.

25. The method in claim 24 which further comprises:
executing the instruction loaded into the instruction register.

26. The method in claim 18 which further comprises:
loading a first register with a scan chain;
loading the feed forward operand latch with the scan chain; and
loading an instruction into an instruction register with the scan chain.

27. The method in claim 26 which further comprises:
executing the instruction loaded into the instruction register.

28. The method in claim 18 which further comprises:
testing a second feed forward operand latch that has a first logical state and a second logical state;
unconditionally selecting an operand from the first register as a second input to the arithmetic logical unit when the second feed forward operand latch is in the first logical state; and
conditionally selecting the operand either from the first register or a third operand source as the second input to the arithmetic logical unit when the second feed forward operand latch is in the second logical state.

* * * * *